Figure 1:
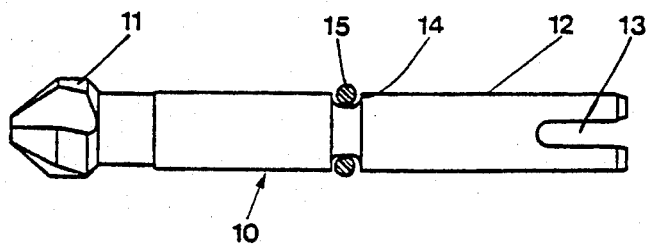

United States Patent [19]

Hofling

[11] Patent Number: 4,509,887
[45] Date of Patent: Apr. 9, 1985

[54] MEANS FOR CONNECTING A MALE PART TO A FEMALE PART

[75] Inventor: Mats E. Hofling, Sandviken, Sweden

[73] Assignee: Santrade Ltd., Lucerne, Switzerland

[21] Appl. No.: 403,520

[22] PCT Filed: Nov. 10, 1981

[86] PCT No.: PCT/SE81/00330
§ 371 Date: Jul. 12, 1982
§ 102(e) Date: Jul. 12, 1982

[87] PCT Pub. No.: WO82/01679
PCT Pub. Date: May 27, 1982

[30] Foreign Application Priority Data

Nov. 13, 1980 [SE] Sweden ................................ 8007963

[51] Int. Cl.³ .............................................. B23B 31/08
[52] U.S. Cl. .................................. 408/239 R; 408/102;
408/239 A
[58] Field of Search ....................... 408/59, 239, 239 A,
408/226, 139–142; 279/1 B, 24, 102, 103, 104,
76, 90, 15 G, 79, 91, 93, 94, 96, 97, 86, 89;
81/177 G, 438; 145/64

[56] References Cited

U.S. PATENT DOCUMENTS

| 2,484,027 | 4/1946 | Haffey | 279/16 |
| 2,790,647 | 4/1957 | Gorgol et al. | 279/97 |
| 2,833,548 | 5/1958 | Clark | 279/102 |
| 3,753,622 | 8/1973 | Miller | 408/59 |
| 3,817,648 | 6/1974 | Miller | 279/24 X |
| 3,984,192 | 8/1976 | Wanner et al. | 279/1 Q X |
| 4,006,787 | 2/1977 | Rumpp et al. | 279/1 Q X |
| 4,006,996 | 2/1977 | Kasabian | 408/239 A |
| 4,096,896 | 6/1978 | Engel | 81/177 G |
| 4,158,522 | 6/1979 | Wirfelt | 408/59 X |
| 4,385,854 | 5/1983 | Miyakawa | 279/103 X |
| 4,404,874 | 9/1983 | Lieser | 81/177 G X |

FOREIGN PATENT DOCUMENTS

| 2820380 | 11/1978 | Fed. Rep. of Germany | 279/1 B |
| 3031216 | 3/1981 | Fed. Rep. of Germany | 279/1 B |
| 719680 | 12/1954 | United Kingdom | 81/438 |

Primary Examiner—William R. Briggs
Assistant Examiner—Glenn L. Webb
Attorney, Agent, or Firm—Burns, Doane, Swecker & Mathis

[57] ABSTRACT

This invention relates to means for connecting a male part with a female part, the male part being provided with a shaft that shall be inserted into a corresponding cavity in the female part and is retained there by means of a frictional device, the female part being to transmit a torsional moment to the male part.

3 Claims, 4 Drawing Figures

MEANS FOR CONNECTING A MALE PART TO A FEMALE PART

In many cases it is desirable to fasten a tool to a rotating shaft in machines which are designed such that an adjustable chuck cannot be used. Examples on such machines are multiple spindle drilling machines, in which the tools are to be fastened on adjustable, hinged shafts, machines for drilling deep holes, where a drill of limited length shall be fastened on an extension shaft, percussion rock drill machines in which the tool shall be fastened such that torsional moment as well as shock impulse may be transmitted to the tool; and thread cutting machines and machines for rotating files and grinding rods.

Tool holders for such machines are previously known, for instance conical sleeves, but have appeared to be impaired by substantial disadvantages. Such conical sleeves require that the tool is forced into the sleeve with a large axial force in order that the friction shall be able to transmit the torsional moment. When exchanging tool it has to be separated from the sleeve by forcing in a wedge between the end of the tool shaft and the bottom of the sleeve. In this connection a considerable space for the wedge is required which means that the sleeve has to be provided with a relatively long, weakening slot. Another disadvantage is that under influence of vibrations or shock impulses the contact force between sleeve and tool shaft can be so large that the sleeve is damaged, or that difficulties arise when loosening the tool.

Another usual sleeve design has a cylindrical hole cooperating with a substantially cylindrical tool shaft with one or several flat surfaces. In the wall of the sleeve there are threaded in one or several screws which when tightening are pressed against the flat surfaces of the tool shaft. This construction can transmit axial forces better without difficulties to loosen the tool. A drawback, however, with this device is that the screws under influence of vibrations can easily get loose, and the wall of the sleeve must be made thick such that the threads of the screws get sufficient engagement, which leads to an unnecessarily heavy and lumbering sleeve. Moreover, the construction is sensible to dust and chips which can easily penetrate between sleeve and shaft.

This invention relates to means for connecting a male part with a female part, the male part preferably comprising a tool with a shaft, for instance a drill, a countersink, a shank end mill, a tap, a reamer, a rotating file and grinding rods, and the female part preferably a tool holder which is similar to a sleeve. The device can transmit torsional moment as well as axial forces, is easy to loosen without aids, allows a very small outer diameter on the sleeve and is insensible to dust and chips.

Figure 2:
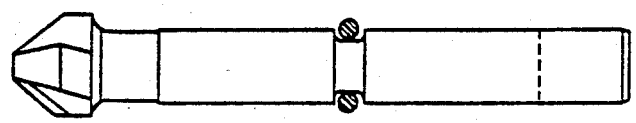
Figure 3:
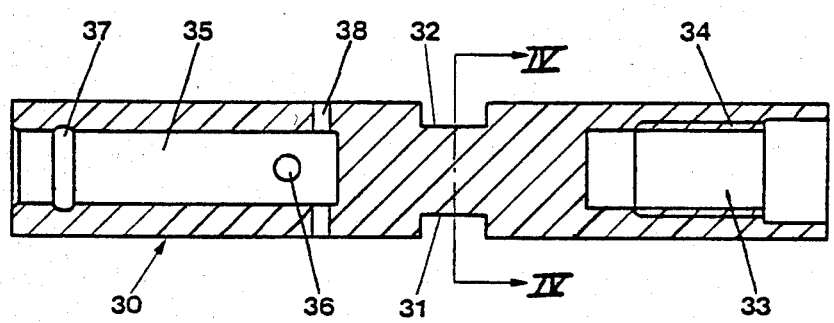
Figure 4:
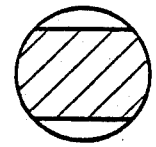

A preferred embodiment of the invention shall be described more closely in connection with accompanying drawings, in which FIG. 1 is a side view of a tool, in this case a countersink, FIG. 2 is a side view of the tool after a rotation of 90 degrees, FIG. 3 is a corresponding tool holder in which the tool is to be inserted, and FIG. 4 is a section along the line IV—IV.

The sleeve 30 disclosed in the drawing has a substantially cylindrical outer part, which on a suitable place may be provided with two grooves 31, 32 which have been milled out and shall constitute grip surfaces for a spanner or a similar tool during the fastening of the sleeve on a spindle in a drilling machine. The sleeve is preferably screwed on the spindle and for this reason one end part of the sleeve has an inner cavity 33 which is provided with threads 34. In the other end part of the sleeve there is also a cavity 35, which is substantially cylindrical and is intended to receive the shaft of the tool. In the near of the bottom of the cavity 35 there is a pin 36 extending diametrically through the cavity and is fastened in the wall of the sleeve 30. In the fore part of the cavity 35 but a little bit from the mouth of the cavity there is an annular, shallow groove 37 without sharp edges and made in the inner wall of the sleeve.

The tool disclosed in the drawing, as stated previously, is a countersink 10 comprising a working head 11 and a shaft 12. In this connection the shaft is substantially cylindrically designed. In its back part there is made a slot 13 going through the shaft and extending in the axial direction. This slot is intended to cooperate with the diametrical pin 36 in the sleeve, whereby the torsional moment can be transmitted from sleeve to tool. A circular groove 14 is made in the tool shaft at a position, which is inside the mouth of the cavity 35 of the sleeve when the tool is wholly inserted into the sleeve. In this position the back part of the tool shaft 12 rests against the bottom wall of the cavity 35, whereby the sleeve can transmit axial forces to the tool. In the groove 14 there is inserted a ring 15 of resilient material, for instance rubber or plastics material. This ring 15 has two functions. It shall partly constitute a seal between sleeve and tool shaft, partly due to the friction against the inner wall of the cavity 35 of the sleeve secure that the tool shaft is fixed to the sleeve during operation. When the back part of the tool shaft is pushed against the bottom of the cavity 35, the groove 14 with the ring 15 has such a position in relation to the sleeve that the ring 15 has sprung into the groove 37 of the cavity 35. This groove 37 is not necessary for the function of the device but has as a task to reduce the deformation of the ring 15 and increase the resistance against the loosening of tool from the sleeve.

The distance between the groove 14 and the back part of the shaft 12 shall be so large that the parts of the shaft and sleeve, which parts due to their form transmit the torsional moment, can reach each other and locate the tool in the direction of rotation, while the groove 14 with the ring 15 still is outside the sleeve in axial direction. Due to this fact the insertion of the tool into the sleeve is simplified.

The tool is fastened to the sleeve by putting the shaft into the sleeve and is located in the direction of rotation by means of the slot 13 and the pin 36. In this connection the axial extension of the slot 13 is so large that the back part of the tool shaft can reach the bottom of the cavity 35 of the sleeve. After the location of the tool in the sleeve in the direction of rotation, the tool is axially inserted further into the cavity 35 of the sleeve such that the resilient ring is deformed and slides against the inner wall of the cavity of the sleeve until the back part of the shaft reaches the bottom of the cavity 35. In this position the ring 15 has reached the groove 37 of the cavity 35 and as previously mentioned springs into the same.

The sleeve 30 is provided with one or several ventilating holes 38 which evacuate the air in the cavity 35 when the tool shaft 12 is pushed into the same.

The friction between the resilient ring and the sleeve is sufficient to prevent such light, rotating tools mentioned in this specification to fall out of the sleeve but is yet not so great as to prevent the tool from being easily loosened from the sleeve by hand. The resilience of the ring gives a seal between the tool shaft and sleeve that prevents dust and chips from entry.

By designing the tool shaft with a diameter that is somewhat less than the inner diameter of the sleeve and by having the resilient ring 15 the tool can move somewhat sideways in relation to the sleeve, which reduces the side forces and increases the length of life for those tools that are to perform a working up of a hole already performed, for instance countersinks, taps, reamers and rotating files.

The invention is not limited to the mentioned embodiment. Thus, the moment transmitting parts of the device may be designed in another way. That part of the shaft to which the sleeve shall transmit the torsional moment may instead of being cylindrical and provided with a slot have a cross section in the form of a semicircle, triangle, quadrangle, pentagon, hexagon, a star or be designed in another suitable way. In such cases is that part of the sleeve that shall transmit the torsional moment to the tool shaft not provided with a pin going through the cavity but the cavity of the moment-transmitting part of the sleeve has a form corresponding to the form of the moment-receiving part of the tool shaft, i.e. if this part has a triangular section the cavity of the moment-transmitting part of the sleeve shall also have a triangular section.

Another suitable form on the moment-transmitting parts in the device can be achieved by giving the back part of the tool shaft the form of a projection similar to a chisel which projection shall be adapted to a corresponding groove in the bottom of the cavity of the sleeve.

In that case when the back part of the tool shaft has that form disclosed in the drawing the moment-transmitting part of the sleeve instead of a pin may comprise a diametrical wall going through the cavity.

By the expression "sleeve" is as a rule meant a device provided with a cavity going through the device. In this specification with the expression "sleeve" is meant a female part, preferably a tool holder having one or several cavities, the cavity not necessarily extending through the whole female part.

I claim:

1. The combination of a tool and a rotary tool holder for receiving said tool to rotate same, one of said tool and holder comprising a sleeve and the other a shaft, said shaft being insertable into said sleeve to an operating position, said shaft and said sleeve including first and second torque transfer means, respectively, which are interengageable for establishing a torque transmitting relationship between said sleeve and said shaft in response to insertion of said shaft into said sleeve with said torque transfer means properly aligned for interengagement, said first and second torque transfer means being mutually alignable in response to relative rotation between said shaft and sleeve and being interengageable into torque-transmitting relationship in response to relative axial, non-rotational movement between said shaft and sleeve, and friction means carried by one of said shaft and sleeve and being frictionally engageable with the other when said shaft is in said operating position so as to frictionally resist mutual separation of said shaft and sleeve, the location of said friction means relative to said first and second torque transfer means being such that said first and second torque transfer means interengage before said friction means engages said other of said shaft and sleeve, whereby said shaft and sleeve can be relatively rotated into proper alignment in the absence of the frictional resistance of said friction means, and said shaft can be thereafter moved to said operating position independently of relative rotation between said shaft and sleeve, said first interengageable torque transfer means comprising a diametrical slit in an end surface of said shaft which is inserted into said sleeve, said slit being open endwise, and said second torque transfer means comprising a diametrical pin disposed in said sleeve and arranged to be received in said slit.

2. The combination of claim 1, wherein said friction means comprises an O-ring of elastic material which is partially countersunk in a circumferential groove of said shaft, said O-ring being arranged to engage an inside surface of said sleeve under elastic compression.

3. The combination of claim 2, wherein the distance between said end surface of said O-ring is greater than the distance between said pin and a mouth of said sleeve.

* * * * *